United States Patent [19]

Nomura

[11] Patent Number: 5,051,764
[45] Date of Patent: Sep. 24, 1991

[54] MOUNTING APPARATUS OF FLEXIBLE PRINTED CIRCUIT BOARD OF LENS

[75] Inventor: Hiroshi Nomura, Tokyo, Japan

[73] Assignee: Asahi Kogaku Kogyo Kabushiki Kaisha, Tokyo, Japan

[21] Appl. No.: 525,740

[22] Filed: May 21, 1990

[30] Foreign Application Priority Data

May 22, 1989 [JP] Japan .............................. 1-58839[U]

[51] Int. Cl.⁵ .......................... G03B 1/18; G03B 17/00
[52] U.S. Cl. ............................ 354/195.1; 354/195.12; 354/286
[58] Field of Search ................. 354/195.1, 195.12, 400, 354/485, 412, 233, 286

[56] References Cited

U.S. PATENT DOCUMENTS

| 4,596,454 | 6/1986 | Kawai et al. ...................... 354/286 |
| 4,864,348 | 9/1989 | Fujiwara et al. ................... 354/485 |
| 4,944,030 | 7/1990 | Haraguchi et al. ............. 354/195.12 |
| 4,951,083 | 8/1990 | Okura et al. ....................... 354/485 |

FOREIGN PATENT DOCUMENTS

63-39216  3/1988  Japan .
2219412  12/1989  United Kingdom .

Primary Examiner—W. B. Perkey
Assistant Examiner—Cassandra C. Spyrou
Attorney, Agent, or Firm—Sandler, Greenblum & Bernstein

[57] ABSTRACT

A mounting apparatus for a flexible printed circuit board of a lens which moves in an optical axis direction and which has a shutter unit provided thereon is disclosed. The flexible printed circuit board is connected at one end to the shutter unit and is bent at least twice to be connected to a control circuit provided on the camera body. A part of the flexible printed circuit board is received in an axially extending receiving groove which is formed in an annular member of the lens. One of the bent portions of the flexible printed circuit board is located in the receiving groove. A securing member is provided to hold the bent portion of the flexible printed circuit board located in the receiving groove between the securing member and the bottom of the receiving groove.

13 Claims, 4 Drawing Sheets

MOUNTING APPARATUS OF FLEXIBLE PRINTED CIRCUIT BOARD OF LENS

BACKGROUND OF THE INVENTION

1. Field of the Invention

The present invention relates to an apparatus for mounting a flexible printed circuit board which electrically connects the shutter unit on a lens side of the board particularly on a zoom lens side, and a control circuit on a camera body side of the board.

2. Description of Related Art

In a recent compact camera, a lens is usually provided with a shutter unit which receives operation signals issued from a camera body, in accordance with a subject distance value and a luminance value of a subject to be photographed. The operation signals are usually transmitted by a flexible printed circuit board (FPC board), to a zoom lens in which a large movement of the shutter unit takes place in the optical axis direction, together with a group of movable lenses of the zoom lens.

The FPC board must be capable of deforming so as to absorb the displacement of the movable lens group. The amount of deformation of the flexible printed circuit board becomes large as the displacement of the movable lens group increases. To this end, usually, the FPC board is bent twice between the shutter unit and the camera body. However, it is very difficult to provide sufficient space at the bent portions and to ensure stability (immovability) of the bent portions. Namely, there is a possibility of an accidental separation of the bent portions of the FPC board from a receiving groove formed in an annular member. The separation may cause the FPC board to interfere with the annular member or another annular member(s) which moves in the optical axis direction. Thus, the FPC board may be damaged and movement of the movable lens will not occur.

In addition to the foregoing, since no precise restriction on the axial movement of the conventional FPC board in the optical axis direction can be effected, the axial movement of the shutter unit causes the FPC board to move in the same direction, thus resulting in an interference of the FPC board with the annular member(s).

SUMMARY OF THE INVENTION

The primary object of the present invention is to provide a mounting apparatus for a flexible printed circuit board in a lens having a flexible printed circuit board, wherein the flexible circuit board can be firmly supported at the bent portions thereof by an annular member.

Another object of the present invention is to provide a mounting apparatus for a flexible printed circuit board in which the axial position of the flexible printed circuit board can be precisely controlled.

To achieve the objects mentioned above, according to the present invention, there is provided a mounting apparatus the a flexible printed circuit board of a lens which moves in an optical axis direction and which has a shutter unit provided thereon, the flexible printed circuit board is connected at its one end to the shutter unit and is bent at least twice to be able to be connected to a control circuit provided on a camera body. A a part of the flexible printed circuit board is received in an axially extending receiving groove which extends in a direction parallel to the optical axis and which is formed in an annular member of the lens. One of the bent portions of the flexible printed circuit board is located in the receiving groove, and a securing member is provided to hold the bent portion of the flexible printed circuit board located in the receiving groove between the securing member and the bottom of the receiving groove.

With this arrangement, the bent portions of the flexible printed circuit board can be securely supported in the receiving groove of the annular member so as to prevent the flexible printed circuit board from interfering with the movable member which moves in the optical axis direction.

The securing device can include, for example, a keeping portion which is located in the receiving groove and a plate portion with an engaging leg which extends in a direction perpendicular to the receiving groove. The annular member can be provided with an insertion groove which receives the engaging leg of the securing device and a prevention wall which is connected to the insertion groove to prevent the engaging leg from coming out of the insertion groove.

To certainly restrict the axial position of the flexible printed circuit board in the optical axis direction, preferably, the receiving groove of the annular member is provided with a wide portion and a narrow portion which is connected to the wide portion by a stepped portion. The flexible printed circuit board is provided with a wide portion and a narrow portion corresponding to the wide and narrow portion of the receiving groove, respectively.

By the engagement of the stepped portion of the FPC board with the corresponding stepped portion of the receiving groove, the axial position of the FPC board in the optical axis direction can be restricted, so that no accidental movement of the FPC board occurs.

The mechanism for restricting the axial position of the FPC board can be applied not only to a flexible printed circuit board having the above mentioned securing device, but also to a flexible printed circuit board having no securing device.

BRIEF DESCRIPTION OF THE DRAWINGS

The invention will be described below in detail with reference to the accompanying drawings that show preferred embodiments of the present invention, in which.

DESCRIPTION OF PREFERRED EMBODIMENTS

Figure 6:
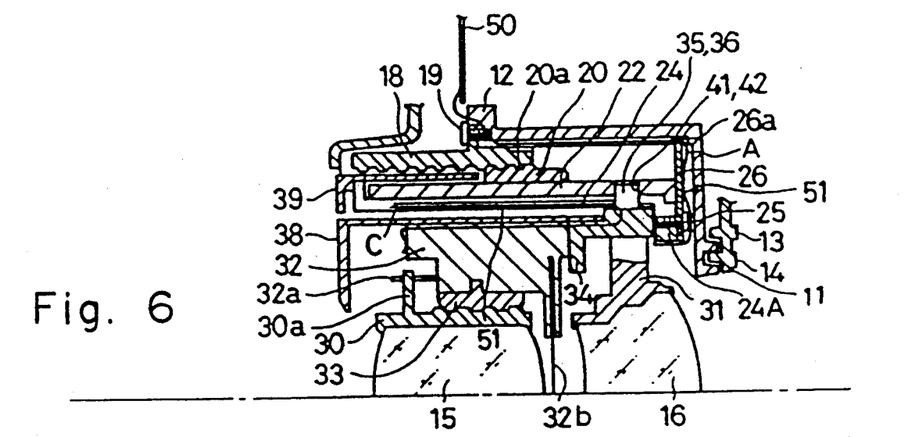
FIGS. 6, 7 and 8 are longitudinal sectional views of an upper half of a lens shutter type of zoom lens to which the present invention is applied, shown in an accommodation position, a WIDE-extremity position and a TELE-extremity position, respectively; and, FIG. 9 is a developed view of a cam ring, a lens guide ring and an inner helicoid ring in a lens shutter type of zoom lens shown in FIGS. 6 through 8.
Figure 7:
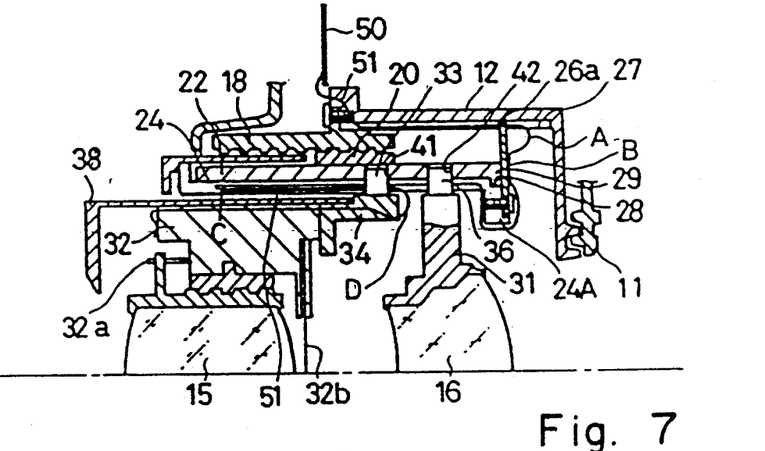
Figure 8:
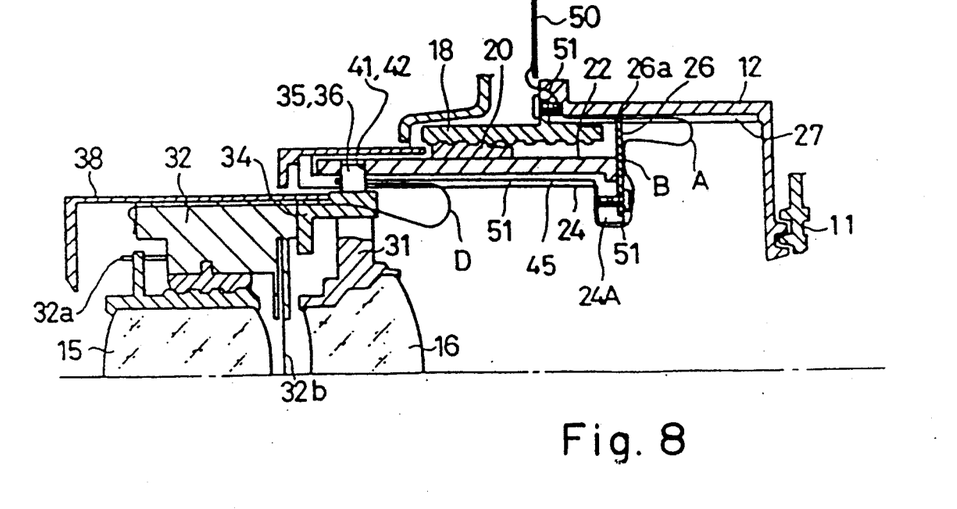

The illustrated embodiments are applied to a lens shutter type of zoom lens camera. FIGS. 6, 7 and 8 show an accommodation position, a WIDE-extremity position and a TELE-extremity position of the zoom lens camera, respectively.

The camera body 11 of a lens shutter type of zoom lens camera has a stationary barrel 12 secured thereto. Numerals 13 and 14 designate an outer rail and an inner rail provided on the camera body 11 to form a film guide, respectively. The outer and inner rails 13 and 14 and a pressure plate (not shown), per se known, define a film passage plane.

Figure 9:
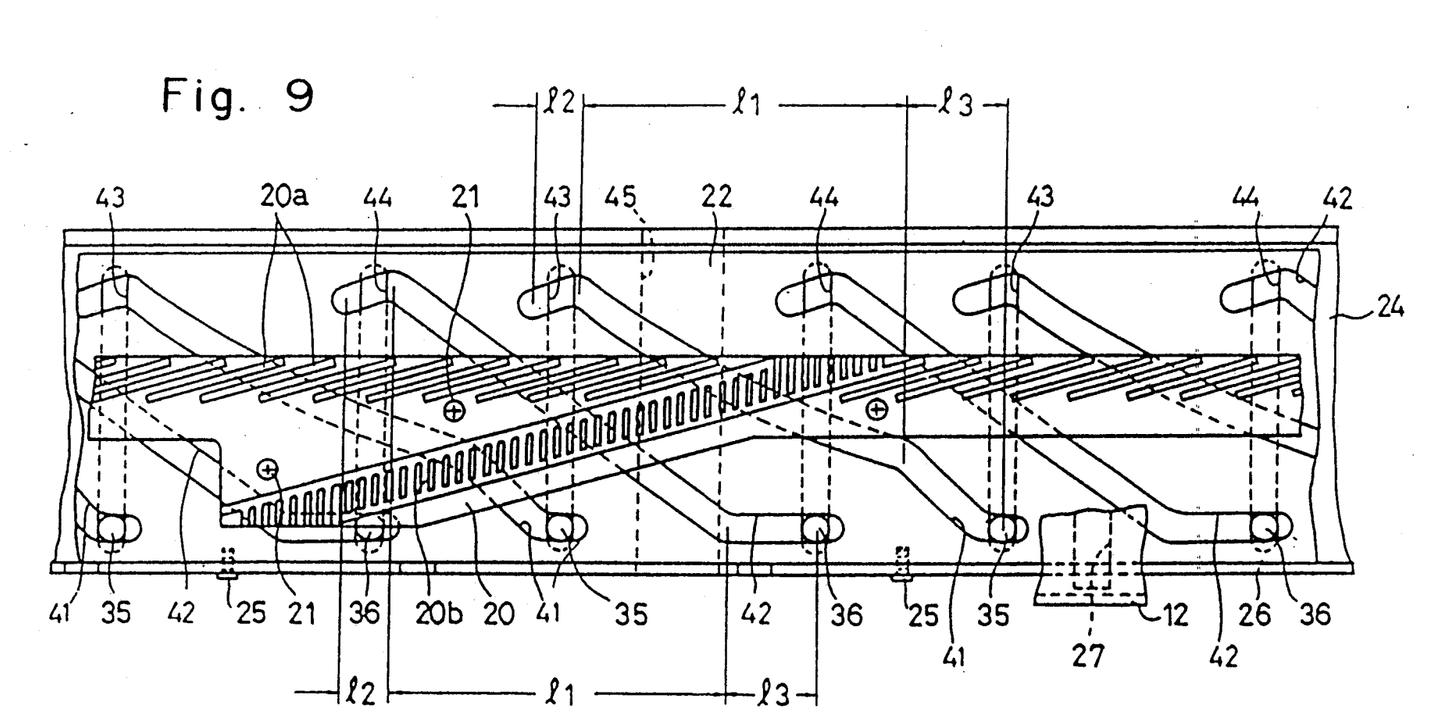

Secured the stationary barrel 12, through set screws 19, is an outer helicoid ring 18 which is provided on its inner periphery with helicoid teeth. The outer helicoid ring 18 is engaged by an inner helicoid ring 20 which is provided on its outer periphery with helicoid teeth 20a. To the inner helicoid ring 20, a cam ring 22 is secured through set screws 21 (FIG. 9).

On the outer periphery of the inner helicoid ring 20 is formed a gear 20b which is inclined in the same direction as the lead angle of the helicoid teeth 20a and which has an optical axis thread extending in parallel with the optical axis direction. The inner helicoid ring 20 is rotated in the forward and reverse directions through a pinion (not shown) which is engaged by the gear 20b and a motor (not shown) which drives the pinion. Consequently, when the inner helicoid ring 20 is rotated in the forward direction and the reverse direction, since the outer helicoid ring 18 engaging therewith is secured to the stationary barrel 12, the inner helicoid ring 20 moves in the optical axis direction together with the cam ring 22 while rotating, in accordance with the lead of the helicoid teeth 20a.

On the inner periphery of the cam ring 22 is fitted a lens guide ring 24 which moves in the optical axis direction together therewith and rotates relative thereto. To the rear end of the lens guide ring 24 is secured a linear movement guide plate 26 through a set screw 25. The linear movement guide plate 26 is provided on its outer periphery with a projection 26a which is engaged in a lens guide ring guide groove 27 formed on the inner surface of the stationary plate 12.

An inner flange 29 which is formed on the rear end of the cam ring 22 is relatively fitted in an annular groove 28 which is formed between the linear movement guide plate 26 and the rear end of the lens guide ring 24, so that the lens guide ring 24 can move in the optical axis direction together with the cam ring 22. The rotational movement of the lens guide ring 24 is restricted by the lens guide ring guide groove 27. The cam ring 22 can rotate relative to the lens guide ring 24.

The front movable lens group 15 and the rear movable lens group 16 are secured to a front lens frame 30 and a rear lens frame 31, which frames are located inside the lens guide ring 24, respectively. The front lens frame 30 is engaged by a helicoid ring 33 secured to a shutter unit 32. The shutter unit 32 is secured to a front movable frame 34 which is provided on its outer periphery with at least three guide pins 35. The rear lens frame 31 is provided on its outer periphery with at least three guide pins 36. The guide pins 35 and 36 are overlapped in FIGS. 6 and 8.

Numerals 38 and 39 designate a cylindrical lens cover integral with the front movable frame 34 and a decorative cylinder which covers the lens guide ring 24 and the cam ring 22, projecting from an outer body shell 11a, respectively.

The cam ring 22 has front cam grooves 41 and rear cam grooves 42 in which the guide pins 35 and 36 are fitted. The lens guide ring 24 has lens guide grooves 43 and 44 corresponding to the front and rear cam grooves 41 and 42. In the illustrated embodiment, the lens guide grooves 43 and 44 are straight grooves extending in the optical axis direction. The guide pins 35 are inserted in the front cam grooves 41 and the lens guide grooves 43, and the guide pins 36 are inserted in the rear cam grooves 42 and the lens guide grooves 44.

The shapes of the front cam grooves 41 and the corresponding lens guide grooves 43 and the shapes of the rear cam grooves 42 and the corresponding lens guide grooves 44 are such that the axial movement of the cam ring 22 and the lens guide ring 24 due to the rotation of the inner helicoid ring 20 and the relative rotation of the cam ring 22 and the lens guide ring 24 cause a predetermined axial displacement of the movable lenses 15 and 16.

In FIG. 9, the section l 1 in the front cam grooves 41 and the adjacent rear cam grooves 42 is a zooming section (normal photographing section), the section l 2 is a macro transfer section connected to a TELE extremity of the zooming section l 1, and the section l 3 is an accommodation section connected to the WIDE extremity of the zooming section l 1. The macro transfer section l 2 has a lead angle opposite to that of the zooming section l 1, with respect to the direction parallel to the optical axis. In other words, if the lead angle of the zooming section l 1 is positive, the lead angle of the macro transfer section l 2 is negative.

In the zoom lens as constructed above, when the inner helicoid ring 20 is rotated in the forward direction or the reverse direction, the inner helicoid ring 20 moves in the optical axis direction in accordance with the lead of the helicoid teeth 20a while rotating. Namely, the cam ring 22 secured to the inner helicoid ring 20 not only rotates together therewith but also moves in the optical axis direction in accordance with the lead of the helicoid teeth 20a.

When the cam ring 22 moves in the optical axial direction, the lens guide ring 24 which is attached to the cam ring 22 so as to rotate relative thereto and to move together in the axial direction moves in the optical axis direction without rotating. The relative rotation of the cam ring 22 and the lens guide ring 24 causes the movable lenses 15 and 16 to move in the optical axis direction due to the relationship between the front cam grooves 41 and the lens guide grooves 43 and between the rear cam grooves 42 and the lens guide grooves 44.

Thus, the movement of the cam ring 22 and the lens guide ring 24 causes the movable lenses 15 and 16 to move from the accommodation position shown in FIG. 6 to the TELE extremity position shown in FIG. 8. It should be appreciated that the lens accommodation length is extremely short, since neither the cam ring 22 nor the lens guide ring 24 protrude from the body shell 11a and the cylindrical lens cover 38.

The shutter unit 32, as is well known, rotates the drive pin 32a by an angle corresponding to a subject distance signal which is issued by a subject distance detecting device to rotate the front lens frame 30 associated with the drive pin 32a through a pin 30a, so that the front lens frame 30 moves in optical axis direction in accordance with the helicoid 33 to effect the focusing.

Furthermore, the shutter and the diaphragm blades 32b operate in accordance with the luminance signal which is issued by a photometer. The distance signal and the luminance signal are fed from a control circuit 50 provided in the camera body 11 to the shutter unit 32 through a flexible printed circuit board 51.

The FPC board 51 connected to the control circuit 50 extends through a window formed in the stationary barrel 12 into a space defined between the stationary barrel 12 and the cam ring 22. In the space, the FPC board 51 extends rearwardly along the inner surface of the stationary barrel 12 to come further rearwardly through a gap between the projection 26a of the linear movement guide plate 26 and the stationary barrel 12.

The FPC board 51 is bend in a generally U-shape at a first bent portion A in the vicinity of the rear end of the stationary ring 12 to be adhered to the outer surface of the linear movement guide plate 26 by an adhesive portion B. The FPC board 51 further extends toward the optical axis and along the inner surface of the lens guide ring 24. The FPC board 51 is bent forwardly at the rear end flange 24A of the lens guide ring 24.

The lens guide ring 24 is provided on its inner periphery with a receiving groove 45 which extends in the optical axis direction to receive the FPC board 51 (FIGS. 1~5). The FPC board 51 which extends along the inner surface of the lens guide ring 24 is inserted in the receiving groove 45 to extend forwardly and is bend rearwardly at a second bent portion C in the vicinity of the front end of the lens guide ring 24, so that the FPC board 51 is brought rearwardly into the receiving groove 45 to be superimposed on the portion of the FPC board already in the receiving groove 45.

The receiving groove 45 has a rear wide portion 45a and a front narrow portion 45b which is connected to the wide portion 45a through a stepped portion 45c. The FPC board 51 has a wide portion 51a, a narrow portion 51b and a stepped portion 51c corresponding to the wide portion 45a, the narrow portion 45b and the stepped portion 45c of the receiving groove 45, so that when the stepped portion 45c of the receiving groove 45 is engaged by the stepped portion 51c of the FPC board 51, the axial displacement of the FPC board 51 is restricted.

The lens guide ring 24 has a through hole 54 which receives the bent portion C of the FPC board 51 in the front of the receiving groove 45. On the opposite sides of the receiving groove 45 is formed an insertion groove 55 which extends perpendicularly to the receiving groove 45. The rear end wall of the insertion groove 55 defines a prevention wall 56. In the front of the through hole 54 is formed a stepped portion 57 for receiving the securing member 60.

The second bend portion C of the FPC board 51 is held between the securing member 60 and the bottom of the receiving groove 45 through the insertion groove 55 and the prevention wall 56. Namely, the securing member 60 which is preferably made of a leaf spring has a flat plate portion 60a of a width corresponding to the width of the receiving groove 45 and an engaging leg 60b which can be fitted in the insertion groove 55. The flat plate portion 60a of the securing member 60 is provided on its front end with an elastically deformable keeping portion 60c which is slightly bent toward the receiving groove 45.

The securing member 60 is superimposed on the second bend portion C of the FPC board 51 after the latter is fitted in the receiving groove 45, so that the engaging leg 60b of the securing member 60 is inserted in the insertion groove 55. Thereafter, the securing member 60 is slid rearwardly so that the engaging leg 60b is brought into contact with the prevention wall 56 which prevents the engaging leg 60b from coming out of the insertion groove 55 (see FIG. 4). The end of the keeping portion 60c comes into engagement in the stepped portion 57. Thus, the securing member 60 is firmly held. In this state, the flat plate portion 60a of the securing member 60 firmly comes into elastic contact with the FPC board 51, so that the second bend portion C of the FPC board 51 is firmly held between the securing member 60 and the bottom of the receiving groove 45. The shape and the thickness of the securing member 60 are such that it can be snugly fitted within the lens guide ring 24.

The FPC board 51 extends further rearwardly in the receiving groove 45 from the mounting position of the securing member 60 and is bent forwardly again at a third bend portion D to be connected to the shutter unit 32.

As can be seen from the foregoing, as viewed from the shutter unit unit, the FPC board 51 extends rearwardly, is bend forwardly at the bent portion D, is inserted in the receiving groove 45, and is bent rearwardly at the bend portion C which is secured to the receiving groove 45 by the securing member 60.

As mentioned above, since the second bend portion C of the FPC board 51 is mounted to the bottom of the receiving groove 45 by the securing member 60, the second bend portion C of the FPC board does not accidentally hang down toward the optical axis, so that no interference of the second bend portion C of the FPC board 51 with the cylindrical lens cover 38 occurs. Furthermore, since the stepped portions 45c and the 51c restrict the axial position of the FPC board 51, there is no possibility that the second bend portion C of the FPC board 51 will project outside through the through hole 54 to interfere with the cam ring 22.

Figure 1:
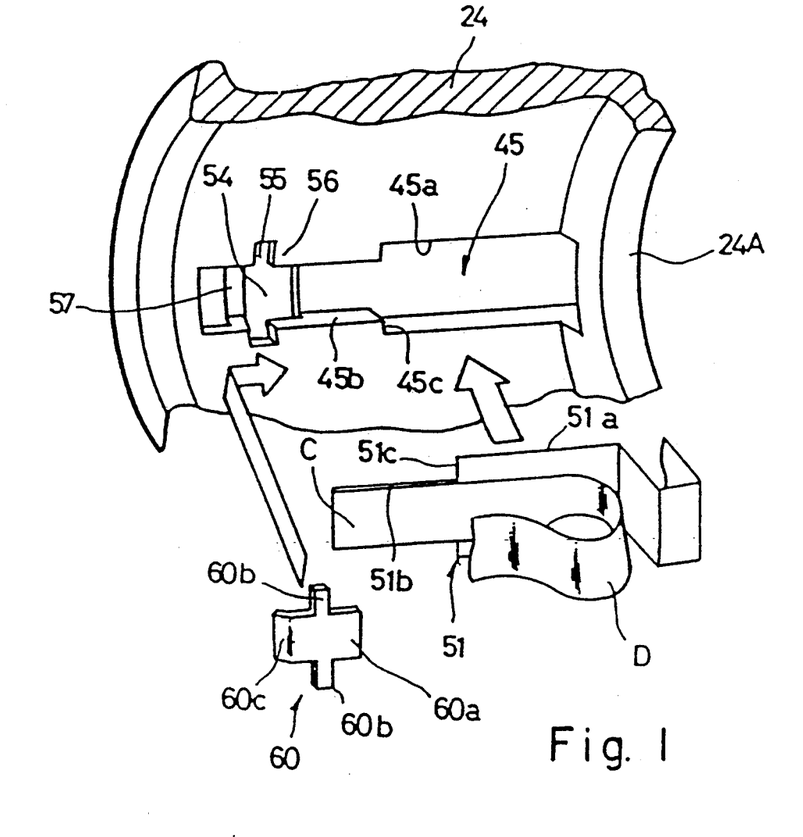
FIG. 1 is a perspective view of a main part of a flexible printed circuit board mounting apparatus according to the present invention, shown in a position before mounting.
Figure 2:
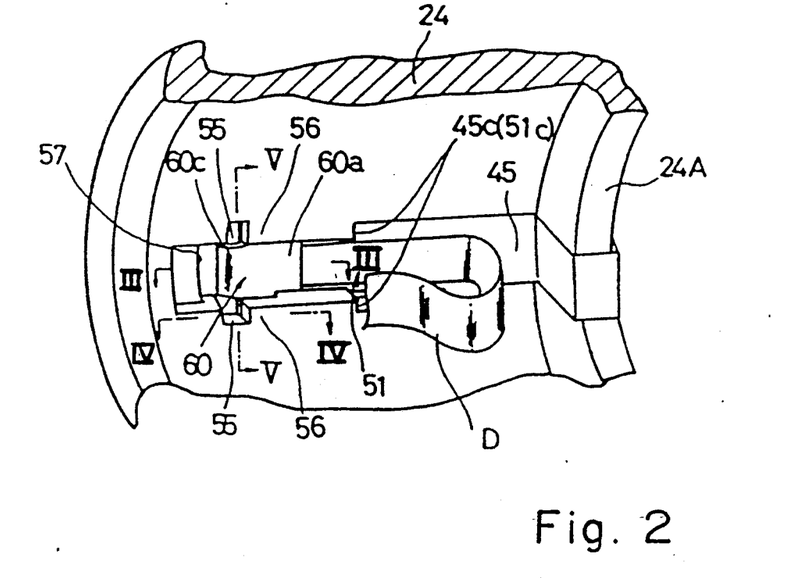
FIG. 2 is a perspective view of a main part of a flexible printed circuit board mounting apparatus according to the present invention, shown in a position after mounting.
Figure 3:
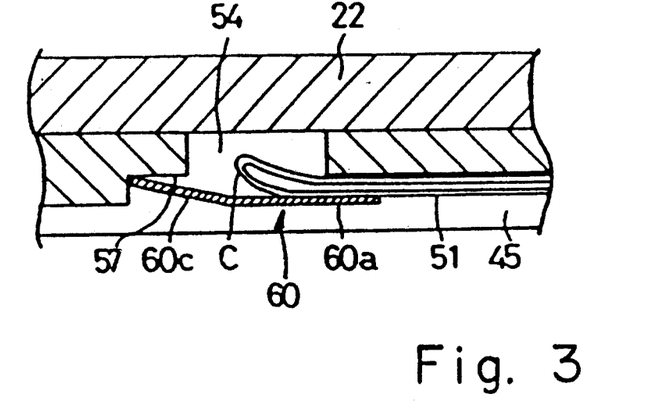
FIGS. 3, 4 and 5 are sectional views taken along the lines III—III, IV—IV and V—V in FIG. 2, respectively.
Figure 4:
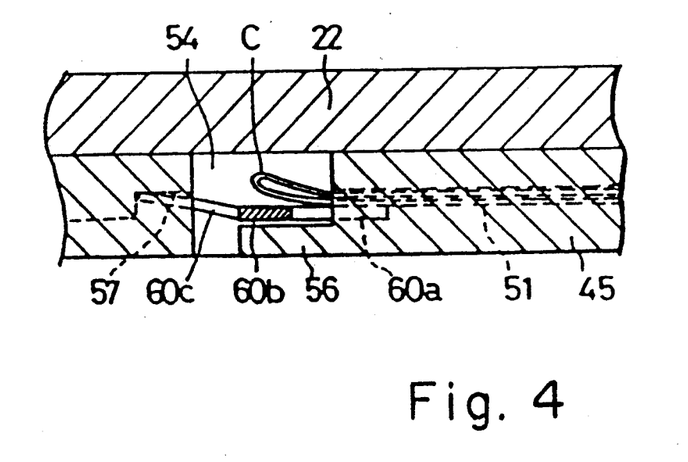
Figure 5:
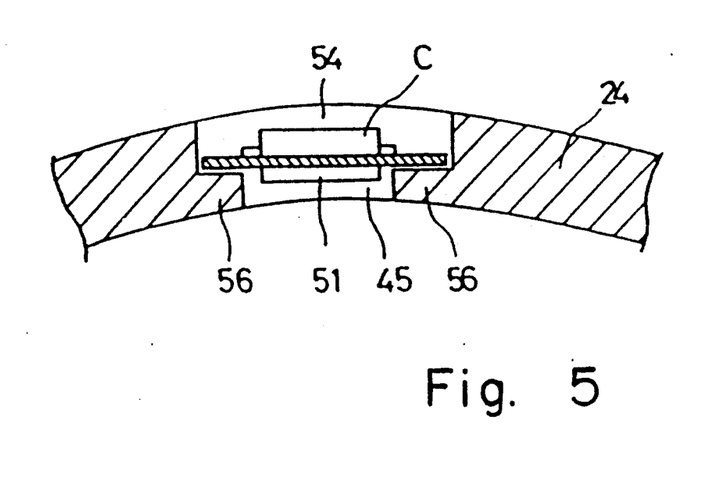

The loop-like shapes of the first bend portion A and the third bend portion D of the FPC board 51 deform during the zooming operation in which the lens barrel moves between the accommodation position shown in FIG. 1 and the TELE extremity position shown in FIG. 3. The length of the FPC board 51 and the movement of the moving members in the optical axis direction of the zoom lens are set, even in the TELE extremity position in which the largest deformation takes place, so that neither the first bend portion A nor the third bend portion D interfere with the other elements and come intrude onto the optical axis of the lens barrel.

As can be understood from the above discussion, according to the present invention, in a camera in which the shutter unit moving in the optical axis direction on the lens side is connected to the control circuit on the camera body side by the flexible printed circuit board which is bent at least twice, since the bent portions of the FPC board are firmly held between a securing member and a bottom of an axially extending receiving groove which is formed in the annular member, the bent portions are prevented from being accidentally displaced or accidentally hanging. Consequently, no interference of the FPC board with a member which moves in the optical axis direction occurs, thus resulting in no damage of the FPC board and no failure of zooming.

Furthermore, the axial position of the flexible printed circuit board can be certainly restricted by the receiving groove of the annular member which has the wide portion and the narrow portion which is connected to the wide portion through the stepped portion, and the flexible printed circuit board which has corresponding wide, narrow and stepped portions.

I claim:

1. A mounting apparatus for a flexible printed circuit board of a lens which moves in an optical axis direction and which includes a shutter unit, a flexible printed circuit board connected at one end to said shutter unit and at the other end to a control circuit provided on a camera body, said flexible printed circuit board bent at least twice to be able to connect said shutter unit and said control circuit, wherein:

a part of said flexible printed circuit board is received in an axially extending receiving groove which extends in a direction parallel to the optical axis direction and which is formed in an annular member of said lens, one of said bent portions of said flexible printed circuit board is located in said receiving groove, and, a securing member, secured to said annular member, to hold said bent portion of said flexible printed circuit board located in said receiving groove.

2. The mounting apparatus for a flexible printed circuit board according to claim 1, wherein said receiving groove of said annular member has a wide portion and a narrow portion which is connected to said wide portion through a stepped portion.

3. The mounting apparatus for a flexible printed circuit board according to claim 2, wherein said flexible printed circuit board has a wide portion, a narrow portion and a stepped portion corresponding to said wide portion, said narrow portion and said stepped portion of said receiving groove.

4. The mounting apparatus for a flexible printed circuit board according to claim 1, said securing member comprising a plate having a keeping portion which can be located in said receiving groove and an engaging leg which extends in a direction perpendicular to said receiving groove.

5. The mounting apparatus for a flexible printed circuit board according to claim 4, wherein said annular member has an insertion groove in which said engaging leg can be fitted and a prevention wall located adjacent to said insertion groove to prevent said engaging leg from coming out of said insertion groove.

6. A mounting apparatus for a flexible printed circuit board of a lens which moves in an optical axis direction and which is connected to a shutter unit, a flexible printed circuit board connected at one end to said shutter unit and at the other end to a control circuit provided on a camera body, and said flexible printed circuit board bent at least twice to connect said shutter unit and said control circuit, wherein:

said lens comprises an annular member having an axially extending receiving groove which extends in a direction parallel to the optical axis direction and which receives said portion and a narrow portion which is connected to said wide portion through a stepped portion, and said flexible printed circuit board has a wide portion, a narrow portion and a stepped portion corresponding to said wide portion, said narrow portion and said stepped portion of said receiving groove.

7. A mounting apparatus for a flexible printed circuit board of a lens comprising:

a movable lens which moves in an optical axis direction;

a shutter unit provided on said movable lens;

a flexible printed circuit board which can connect said shutter unit to a control circuit on a camera body;

an annular member located on an outer periphery of said shutter unit;

a receiving groove formed in an inner surface of said annular member to receive said flexible printed circuit board; and, a securing member which holds a bent portion of said flexible printed circuit board which is located in said receiving groove.

8. The mounting apparatus for a flexible printed circuit board according to claim 7, wherein the portion of said flexible printed circuit board which rearwardly extends from said shutter unit is bent forwardly at a first bend portion to be inserted in said receiving groove, and is then bent rearwardly again at a second bend portion which is immovably held by said securing member.

9. The mounting apparatus for a flexible printed circuit board according to claim 8, wherein said first bend portion of said flexible printed circuit board is free to deform.

10. The mounting apparatus of a flexible printed circuit board according to claim 9, wherein said receiving groove of said annular member has a wide portion and a narrow portion which is connected to said wide portion through a stepped portion.

11. The mounting apparatus for a flexible printed circuit board according to claim 10, wherein said flexible printed circuit board has a wide portion, a narrow portion and a stepped portion corresponding to said wide portion, said narrow portion and said stepped portion of said receiving groove.

12. The mounting apparatus of a flexible printed circuit board according to claim 8, wherein said securing member is made for an elastically deformable leaf spring.

13. A flexible printed circuit board which extends along an inner surface of an annular member of a lens, said surface having a wide portion and a narrow portion which is connected to said wide portion through a stepped portion which is adapted to restrict the axial position of said flexible printed circuit board.

* * * * *

UNITED STATES PATENT AND TRADEMARK OFFICE
CERTIFICATE OF CORRECTION

PATENT NO. : 5,051,764
DATED : September 24, 1991
INVENTOR(S) : H. NOMURA

It is certified that error appears in the above-indentified patent and that said Letters Patent is hereby corrected as shown below:

At column 8, line 35 (claim 10, line 1), change "of" to ---for---.

At column 8, line 47 (claim 12, line 1), change "of" to ---for---.

At column 8, line 49 (claim 12, line 3), change "for" to ---of---.

Signed and Sealed this

Nineteenth Day of April, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,051,764
DATED : September 24, 1991
INVENTOR(S) : H. NOMURA

It is certified that error appears in the above-indentified patent and that said Letters Patent is hereby corrected as shown below:

At column 7, line 57, (claim 6, line 12) insert ---flexible printed circuit board, said receiving groove having a wide--- after "said".

Signed and Sealed this

Third Day of January, 1995

*Attest:*

BRUCE LEHMAN

*Attesting Officer*          *Commissioner of Patents and Trademarks*